Patented June 10, 1941

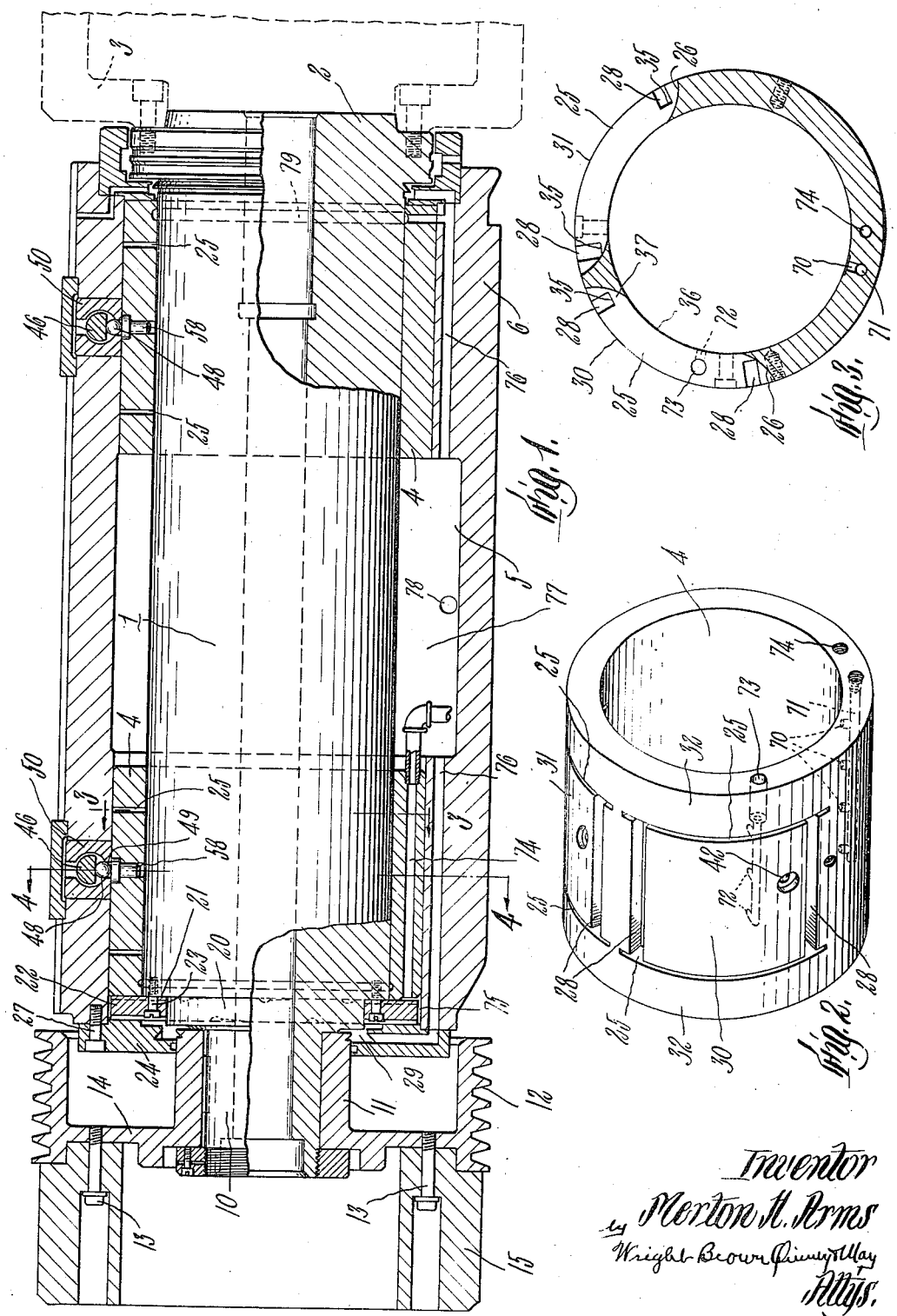

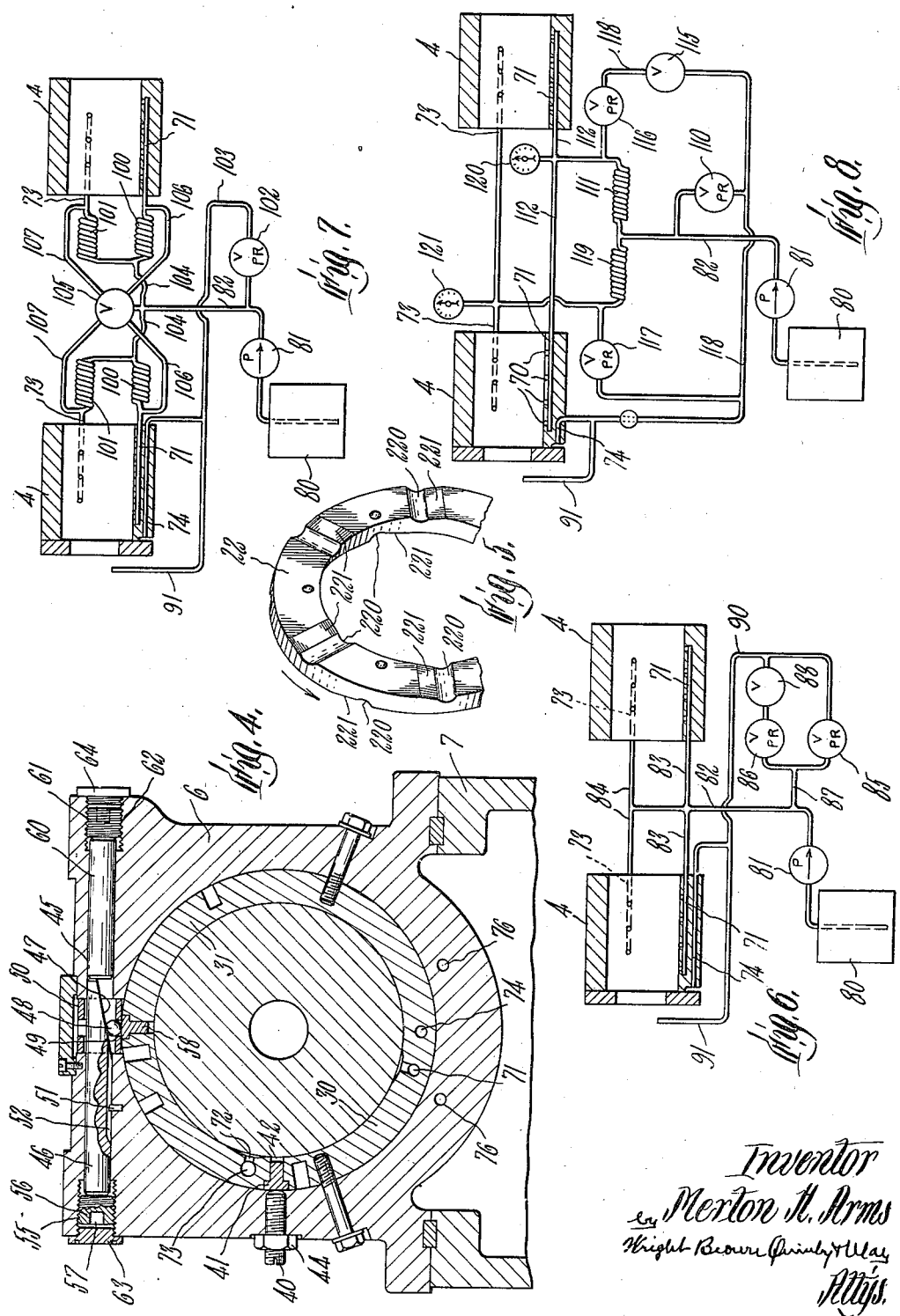

2,245,378

UNITED STATES PATENT OFFICE 2,245,378

SPINDLE AND BEARING THEREFOR

Merton H. Arms, Springfield, Vt., assignor to Bryant Chucking Grinder Company, Springfield, Vt., a corporation of Vermont Application July 7, 1938, Serial No. 217,886

6 Claims. (Cl. 308—65)

This invention relates to spindles and bearings and has for an object to provide a construction, particularly suitable for the mounting of shafts or spindles of relatively large diameters and which carry considerable weight, but which must be maintained accurately in position and properly lubricated. One example of such a shaft or spindle may be found in machines for grinding cylindrical parts of considerable size and weight, such, for example, as raceways for the larger sizes of ball and roller bearings.

One feature of the invention relates to the provision for proper balance of the rotating parts whereby bearing pressures may be approximately uniform throughout the length of the bearing portion.

A further feature of the invention relates to the construction of the bearings whereby they may be accurately adjusted for wear but so constructed as to maintain a continuous lubricant film entirely around the shaft or spindle.

A further feature of the invention relates to special provisions for securing lubrication and means whereby the weight of the spindle or shaft may be supported on an oil film which may be introduced under heavier pressure when starting the rotation in order to provide for easier starting, after which the pressure may be reduced.

For a more complete understanding of this invention, together with further objects, and advantageous constructions, reference may be had to the accompanying drawings, in which Figure 1 is a central longitudinal section through the spindle bearing, the spindle being shown partly in elevation and partly in section.

Figure 2 is a perspective view of a bearing bushing turned slightly from its normal angular position in order to better show certain of the parts.

Figures 3 and 4 are detail sections on lines 3—3 and 4—4, respectively, of Figure 1.

Figure 5 is a fragmentary perspective of a thrust bearing ring.

Figures 6, 7 and 8 are diagrammatic views illustrating various arrangements for lubricating the bearing.

Referring first to Figure 1, at 1 is shown a spindle or shaft provided at one end with a nose 2 to which may be secured a work holder of any desired type, such as the chuck indicated in dotted lines at 3. This spindle is shown as carried in a pair of spaced bearing bushings 4 which are mounted within an opening 5 in a support 6. This support 6, as shown best in Figure 4, may be secured to a bed 7 of the machine. This machine may be of any desired type, one for which this invention is particularly suitable being a grinding machine, though the invention might be applied to any other type of machine, particularly where the spindle or shaft is of substantial diameter and the weights to be borne thereby are substantial. In order to drive the spindle the opposite end thereof from the spindle nose 2 may be of reduced diameter, as at 10, and may have keyed or otherwise suitably secured thereto the hub portion 11 of a belt pulley 12. As shown this belt pulley is of the multiple V-type, though any other desired form of pulley might be employed.

As in machines of this character, the work holder or chuck 3 and the work carried thereby are of substantial weight, provision may be made to substantially equalize the weight borne by the two sleeves 4, and for this purpose a counterweight 15 of the desired weight may be secured as by the screws 13 to the web 14 of the belt pulley. These bushings are preferably made of a bearing metal such as bronze or the like.

Adjacent to the reduced diameter portion 19 of the spindle it may have a portion 20 of somewhat larger diameter, but of smaller diameter than the main portion of the spindle to form with this main portion an annular shoulder 21 for the reception of a thrust bearing ring 22. This ring 22 engages the outer end of the adjacent bushing 4 and is held in position secured to the spindle 1 as by the countersunk screws 23. Its outer face bears against the inner face of a bearing retainer collar 24 secured as by the screws 27 to the support 6. The inner face of the retainer 24 is preferably cut away adjacent to its inner diameter to form a lubricant-receiving chamber 29 for a purpose which will later appear.

The bushings 4 are so constructed as to present a circumferentially completely continuous inner face for bearing engagement on the spindle 1, but means are provided by which wear between the parts may be taken up. As shown each bushing 4 is provided with two pairs of longitudinally spaced slots 25 which extend entirely through the wall of the bushing for a portion of its circumference. These slots may be cut by a rotary cutter which leaves the ends of the slots beveled as shown at 26 in Figure 3. These slots are connected longitudinally of each bushing near to the ends by the grooves 28 cut inwardly from the outer face of the bushing but terminating outwardly of the interior bore thereof. These grooves 28 and the slots 25 define a pair of portions 30 and 31 cut away from the end portions 32 of the bushing by the slots 25 and partly severed from each other and from the uncut portion of the bushing by the grooves 28, which define between their bases 35 and the inner face 36 of the bushing, integral connecting portions 37. These connecting portions 37 are sufficiently flexible to permit the portions 30 and 31 to be deflected inwardly toward the axis of the bushing so as to take up wear and without any interruption of the continuous circumferential inner surface of the bushings within the lengths partly defined by the slots 25, except where oil holes extend therethrough as will later appear.

As shown best in Figure 4 each bushing is so positioned in its support 6 that the portions 30 and 31 form front and top bearing portions. The portion 30 is arranged to be forced inwardly by means carried by the support 6, which, as shown in Figure 4, comprise the screws 40, the inner ends of which bear against hardened wear plugs 41 seated in openings 42 extending through the portions 30. These screws 40 are threaded through the support 6 and may be held in adjusted position as by the lock nuts 44. As shown there is one such adjusting screw for each bushing, but it will be recognized that more than one might be employed if desired. The upper face of the support 6 may be employed to carry other parts of the machine and hence it may not be possible to provide as direct means for pressing the portion 31 inwardly as for pressing the portion 30 inwardly. As shown means are provided which are accessible from the side faces of the portion 6 for accomplishing this function. For example, there is shown in Figure 4 a cross bore 45 within which is movable a wedge piece 46 having a wedge face 47 which engages a ball 48 carried in an opening 49 in a block 50 seated in a recess or socket in the top face of the support 6. The wedge piece 46 may be keyed against axial rotation as by the fixed pin 51 riding in a slot 52 therein. The outer end of the piece 46 may enter into a threaded socket 55 into which may be inserted a threaded plug 56, provided with a screwdriver slot 57 in its outer end. Inward adjustment of the plug 56 engaging the wedge piece 46 will serve to press the ball 48 inwardly against the wear plug 58 and force the section 31 inwardly. The small end of the wedge piece 46 is engaged by a bar 60 also slidable within the bore 49, this being engaged at its outer end by the threaded plug 61 similar to the plug 56 and by inward adjustment of which the wedge piece 46 may be retracted to release the pressure on the ball 48. This plug 61 is seated in a threaded socket 62. The socket 55 and the socket 62 may be closed off at their outer ends by closure plugs 63 and 64, respectively. It will be seen that this construction provides means for taking up wear between the bearing bushings and the spindle and yet provides a circumferentially continuous inner surface for each of the bushings which makes possible the insurance of a continuous film of lubricating oil around the circumference of the spindle. Means are provided for introducing a lubricant between the inner face of each bushing and the spindle or shaft and for lubricating the thrust bearing adjacent to the belt pulley 12. When starting the rotation of the shaft or spindle it may be desirable to introduce lubricant under a higher than normal pressure beneath it so as to force it away from the lower face of the bushing, thus to make starting easier, and after the rotation has been started this pressure may be reduced in order to permit the spindle to settle back into its normal rotating position with the film of oil maintained beneath it and floating its weight.

For a purpose of lubrication, a plurality of oil holes, preferably in two series, may be employed. One of these series of oil holes, such as 70, open on the inner face of the bushing 4 beneath and slightly to one side of the spindle and communicate with a passage 71 extending through one end of the bushing. The holes of the other series shown at 72, which are staggered with respect to the holes 70, extend to the interior of the bushing at one side of the spindle and communicate with the passage 73. The holes 70 and 72 open into shallow chambers making small angles with the bearing surface of the bushing to lead the oil in between the spindle and bearing, this action being enhanced by the rotation of the spindle. The staggering of the two sets of oil holes affords a more even distribution of the oil. As shown in Figure 4, the rotation of the spindle is counterclockwise and the openings 72 are on the left hand side of the spindle. The oil pressure is thus so directed as to push the spindle rearwardly in the same direction as the force of the grinding wheel cut, so that it can have no effect tending to feed the work toward the wheel and thus deepen the cut. A lubricant passage 74 leads through the bushing directly beneath the center of the spindle and passes to the thrust bearing reservoir 75 from which it may find its way past the thrust bearing collar 22 into the passage 29 from which it may escape through one of the two passages 76 in the support 6 to the central sump 77 from which it may be discharged through the passage 78. The other passage 76 serves to return oil escaping at the front end of the bushing 4.

As best shown in Figure 5 the thrust bearing ring or collar 22 may be so constructed as to aid in the distribution of lubricant between it and adjacent parts. To this end, it is shown as provided on opposite faces, preferably in staggered relation, with radial oil grooves forming lubricant-receiving chambers 220, the side face adjacent to each groove at the trailing edge in a direction of rotation being ground off as at 221 to give a small angle of approach for the oil, tending, as the ring or collar 22 rotates, to draw oil in between the bearing surfaces similarly to the action at the openings 70 and 72.

In Figures 6, 7 and 8 various oil distributing systems are shown for supplying lubricant to the various bearings. In these figures, at 80 is shown a source of lubricant supply from which it is drawn through a suitable pipe by the pump 81. In the arrangement shown in Figure 6, the oil is driven by this pump through the pipes 82, 83, and 84 to the bearing lubricating passages 71 and 73. The pressure of this supply is regulated by one or the other of a pair of relief valves 85 and 86 connected to the line 82 through the line 87. The pressure relief valve 85 is set for relatively high pressure while the pressure relief valve 86 is set for a lower pressure, but this pressure relief valve 86 may be rendered ineffective by closing the valve 88 in its discharge line. Under these conditions oil under a relatively heavy pressure is supplied to the bearing sleeves 4 in order to facilitate starting their rotation. After rotation has been established the valve 88 may be opened, whereupon the pressure is reduced. The discharge from both the pressure relief valves 85 and 86 passes into a pipe 90 which leads to the thrust bearing passage 74, and in order to limit the pressure therein to a low value, the pipe 90 may be provided with a gravity discharge pipe 91, the upper end of which is open, but which is placed sufficiently higher than the supply passage 74 so as to provide a sufficient supply of lubricant to the thrust bearing but under very low pressure, this thrust bearing being lubricated rather by rotation of the collar 22 dipping into the reservoir 75 than by pressure lubrication. Oil escaping from the pipe 91 may be conducted back by any suitable means (not shown) to the supply 80.

In Figure 7 a different arrangement is employed in which means at 100 and 101 shown as choke coils may be employed to limit the amount of oil flowing to the oil holes of the bushings 4. These choke coils are of such proportion that if the outer ends were open to the atmosphere a relatively small amount of oil would flow from them. The oil is supplied under a pressure determined by the relief valve 102, and the discharge line 103 leads to the thrust bearing oil passage 74. Oil is conducted through the branch pipes 104 to one end of each of the choke coils. The opposite ends of the coils 100 lead to the pressure passages 71 and the opposite ends of the coils 101 lead to the pressure passages 73. The pressure line also leads to the valve 105 which may be turned to by-pass any of the coils 100 or 101 through the branch connections 106 and 107, respectively. When these coils are by-passed, the full pressure from the pressure line 82 is supplied quite directly to the oil passages 71 and 73. The discharge pressure line 103 which leads to the thrust bearing may also have its pressure controlled by the open ended pipe 91 as in Figure 6.

In Figure 8 a still different arrangement is employed in which pressures are independently applicable to the passages 71 and the passages 72. The pressure in the pressure line 82 is controlled by the high pressure relief valve 110 and leads to one end of the choke coil 111 which is interposed in the line 112 leading to the pressure passages 71. So long as the valve 115 in the low pressure line 118 is closed the pressure in the lower passages 71 is controlled by the pressure relief valve 110, but by opening the valve 115 this pressure is controlled by the lower pressure relief valve 116. Thus either of two selected pressures, one higher than the other, may be employed for the passages 71, the higher being employed when the rotation of the spindle is being started and the lower being used after the rotation has been well established. The side pressure passages 72 have their oil pressure controlled by the pressure relief valve 117 at all times so long as the rate of flow is sufficiently less than that which can pass the choke 119 to permit the building up of pressure therein to the point determined by the setting of this value. All of the pressure relief valves 110, 116 and 117 discharge into the low pressure line 118 which leads to the thrust bearing passage 74, the pressure therein being controlled by the open ended pipe 91. Pressure indicators are shown at 120 and 121 for the pressure passages 71 and 73.

The lubrication features of this invention are not claimed herein, but form subject matter of a divisional application Serial No. 276,179, filed May 27, 1939, for Bearing lubrication.

From the foregoing description of certain embodiments of this invention, it should be evident to those skilled in the art that various changes and modifications might be made without departing from the spirit or scope of this invention as defined by the appended claims.

I claim:

1. A cylindrical bearing bushing having a pair of transverse slots extending through its wall spaced lengthwise thereof and a pair of circumferentially spaced grooves in the outer face of said bushing intersecting said slots and defining therewith a segmental portion integral with the remainder of said bushing and bonded thereto by walls of less thickness than the remainder of said bushing, said portion being deflectable to permit taking up wear while maintaining complete circumferential continuity of the inner face of said bushing between said slots.

2. A bearing bushing having a circumferentially complete continuous inside face and provided with a pair of circumferential portions partly severed from each other and from the remainder of said bushing by external grooves terminating outwardly of the inside surface of the bushing and forming bendable connecting portions of less thickness than the remainder of said bushing, whereby said portions presenting integral parts of said continuous inside face may be forced toward the axis of said bushing to take up wear.

3. A bearing comprising a support having a hole therethrough, a bearing bushing seated within said hole, said bushing having a portion integrally connected by relatively thin wall parts to the remainder of said bushing and deflectable to permit inward motion of said portion while maintaining complete circumferential continuity of the inner face of said bushing at said portion, and means carried by said support and operatively connected to said portion for forcing said portion inwardly to take up wear between said bushing and a shaft journaled therein.

4. A bearing comprising a support having a hole therethrough, a bearing bushing seated within said hole, said bushing having a portion integrally connected by relatively thin wall parts to the remainder of said bushing and deflectable to permit inward motion of said portion while maintaining complete circumferential continuity of the inner face of said bushing at said portion, and means movable transverse to the axis of said bushing and carried by said support operative to force said portion inwardly to take up wear between said bushing and a shaft journaled therein.

5. A bearing comprising a support having a hole therethrough, a bearing bushing seated within said hole, said bushing having a portion integrally connected by relatively thin wall parts to the remainder of said bushing and deflectable to permit inward motion of said portion while maintaining complete circumferential continuity of the inner face of said bushing at said portion, said support having a bore transverse to and non-intersecting said hole, a wedge piece in said bore, means for adjusting said wedge piece axially within said bore, and means engaging the wedge face of said piece and operatively connected to said bushing portion for forcing said portion inwardly as said piece is moved in one direction to take up wear between said bushing and a shaft journaled therein.

6. A bearing bushing cut inwardly part way from its outer face toward its inside face to define a portion having a deflectable integral bond with an adjacent portion permitting inward displacement of said defined portion to take up wear but providing a continuous complete circumferential inside face at said portion.

MERTON H. ARMS.